(12) United States Patent
Littrell et al.

(10) Patent No.: US 9,172,274 B2
(45) Date of Patent: Oct. 27, 2015

(54) SYSTEM, METHOD, AND APPARATUS FOR OPERATING A POWER DISTRIBUTION SYSTEM

(75) Inventors: Nathan Bowman Littrell, Gardnerville, NV (US); James Joseph Schmid, Danville, CA (US)

(73) Assignee: General Electric Company, Schenectady, NY (US)

( * ) Notice: Subject to any disclaimer, the term of this patent is extended or adjusted under 35 U.S.C. 154(b) by 252 days.

(21) Appl. No.: 13/161,881

(22) Filed: Jun. 16, 2011

(65) Prior Publication Data

US 2012/0323388 A1  Dec. 20, 2012

(51) Int. Cl.
*H02J 13/00* (2006.01)
*H02J 3/00* (2006.01)
*H02J 3/14* (2006.01)
*H02J 3/18* (2006.01)

(52) U.S. Cl.
CPC ............... *H02J 13/0006* (2013.01); *H02J 3/00* (2013.01); *H02J 3/14* (2013.01); *H02J 3/1878* (2013.01); *H02J 2003/007* (2013.01); *Y02E 40/30* (2013.01); *Y02E 40/74* (2013.01); *Y02E 40/76* (2013.01); *Y02E 60/76* (2013.01); *Y04S 10/22* (2013.01); *Y04S 10/545* (2013.01); *Y04S 40/22* (2013.01)

(58) Field of Classification Search
CPC ........ G06Q 50/06; H02J 13/0006; H02J 3/00; H02J 3/1878; H02J 2003/007; H02J 3/14; Y02E 40/30; Y02E 40/74; Y02E 40/76; Y02E 60/76; Y04S 10/545; Y04S 40/22; Y04S 10/22

USPC ............ 700/286, 291, 292, 297, 298; 702/60, 702/61; 703/4
See application file for complete search history.

(56) References Cited

U.S. PATENT DOCUMENTS

| 5,422,561 | A  | * | 6/1995 | Williams et al. ............... 323/209 |
| 6,388,564 | B1 |   | 5/2002 | Piercy et al. |
| 7,142,949 | B2 |   | 11/2006 | Brewster et al. |
| 7,248,978 | B2 | * | 7/2007 | Ransom ........................... 702/62 |
| 7,283,943 | B1 |   | 10/2007 | Qi et al. |
| 7,528,496 | B2 | * | 5/2009 | Fortmann ......................... 290/44 |
| 8,126,685 | B2 | * | 2/2012 | Nasle ................................. 703/4 |

(Continued)

FOREIGN PATENT DOCUMENTS

WO    2008030033 A2    1/2008

OTHER PUBLICATIONS

Office Action issued in connection with NZ Application No. 600601, Jun. 19, 2012.

(Continued)

*Primary Examiner* — Mohammad Ali
*Assistant Examiner* — Ziaul Karim
(74) *Attorney, Agent, or Firm* — Armstrong Teasdale LLP

(57) ABSTRACT

A power distribution system includes a plurality of node devices and a computer communicatively coupled to the node devices. The computer includes a memory area configured to store at least one operating parameter of each of the node devices, and a processor that is programmed to determine a desired operating limitation of the power distribution system to be optimized, calculate an effect on the operating limitation based on a modification of the operating parameter of at least one of the node devices, and transmit a command to the node device to cause the node device to modify the operating parameter.

14 Claims, 2 Drawing Sheets

(56) References Cited

U.S. PATENT DOCUMENTS

| | | | |
|---|---|---|---|
| 8,200,372 B2* | 6/2012 | Joos et al. | 700/292 |
| 8,244,406 B2* | 8/2012 | Momoh | 700/291 |
| 8,412,654 B2* | 4/2013 | Montalvo | 706/15 |
| 8,417,360 B2* | 4/2013 | Sustaeta et al. | 700/28 |
| 8,731,728 B2* | 5/2014 | Milosevic et al. | 700/291 |
| 2005/0125104 A1* | 6/2005 | Wilson et al. | 700/295 |
| 2007/0085343 A1 | 4/2007 | Fortmann | |
| 2007/0085353 A1 | 4/2007 | Cheng | |
| 2007/0115116 A1* | 5/2007 | Zabek | 340/539.22 |
| 2008/0039979 A1* | 2/2008 | Bridges et al. | 700/292 |
| 2008/0052145 A1* | 2/2008 | Kaplan et al. | 705/8 |
| 2008/0120080 A1* | 5/2008 | Nasle | 703/13 |
| 2008/0319893 A1 | 12/2008 | Mashinsky et al. | |
| 2009/0157529 A1* | 6/2009 | Ehlers et al. | 705/26 |
| 2009/0187579 A1 | 7/2009 | Brancaccio et al. | |
| 2010/0179862 A1 | 7/2010 | Chassin et al. | |
| 2010/0217550 A1 | 8/2010 | Crabtree et al. | |
| 2011/0029461 A1 | 2/2011 | Hardin, Jr. | |
| 2011/0040666 A1 | 2/2011 | Crabtree et al. | |
| 2011/0066300 A1 | 3/2011 | Tyagi et al. | |
| 2011/0084672 A1* | 4/2011 | Labuschagne et al. | 323/255 |
| 2011/0106321 A1* | 5/2011 | Cherian et al. | 700/286 |
| 2012/0029720 A1* | 2/2012 | Cherian et al. | 700/297 |
| 2012/0029897 A1* | 2/2012 | Cherian et al. | 703/18 |
| 2012/0271479 A1* | 10/2012 | Schmid et al. | 700/298 |
| 2012/0316808 A1* | 12/2012 | Frader-Thompson et al. | 702/61 |
| 2013/0117004 A1* | 5/2013 | Schultz et al. | 703/18 |

OTHER PUBLICATIONS

Search Report issued in connection with GB Application No. 1210222.4, Oct. 11, 2012.

* cited by examiner

SYSTEM, METHOD, AND APPARATUS FOR OPERATING A POWER DISTRIBUTION SYSTEM

BACKGROUND OF THE INVENTION

The embodiments described herein relate generally to power distribution systems and, more particularly, to systems and methods for use in enhancing operation of power distribution systems.

As the demand for power has increased, the likelihood of brownouts and/or rolling blackouts has similarly increased. To reduce the likelihood of such events, at least some known power distribution systems initiate demand response events during periods of high energy demand to avoid overburdening the power grid. For example, some known power distribution systems use smart meters to monitor and to automatically modify power usage by a load, such as a consumer's home or a particular home appliance within a home. When at least some known smart meters receive a message from the utility that a demand response event has been initiated, the smart meter determines one or more loads that are drawing an excessive amount of power, is programmed to then automatically power off those loads or alert the owner of the excessive power draw in response to the demand response event. However, known devices reduce load on the power grid without considering the effect the load reduction can have on efficiency and/or delivery costs elsewhere in the grid. As such, the overall benefits of such devices may be limited by losses created elsewhere in the grid.

BRIEF DESCRIPTION OF THE INVENTION

In one aspect, a method is provided for operating a power distribution system including a computer and a plurality of node devices. The method includes using a computer to determine a desired operating limitation of the power distribution system to be optimized. The computer calculates an effect on the operating limitation based on a modification of at least one operating parameter of at least one node device of the plurality of node devices, and transmits a command to the node device to cause the node device to modify the operating parameter.

In another aspect, a power distribution system includes a plurality of node devices and a computer communicatively coupled to the node devices. The computer includes a memory area configured to store at least one operating parameter of each of the node devices, and includes a processor that is programmed to determine a desired operating limitation of the power distribution system to be optimized, calculate an effect on the operating limitation based on a modification of the operating parameter of at least one of the node devices, and transmit a command to the node device to cause the node device to modify the operating parameter.

In another aspect, a computer is provided for use with a power distribution system including a plurality of node devices. The computer includes a memory area configured to store at least one operating parameter of each of the node devices, and a processor communicatively coupled to the memory area. The processor is programmed to determine a desired operating limitation of the power distribution system to be optimized, calculate an effect on the operating limitation based on a modification of the operating parameter of at least one of nodes devices, and transmit a command to the node device to cause the node device to modify the operating parameter.

DETAILED DESCRIPTION OF THE INVENTION

Exemplary embodiments of systems and methods for use in enhancing operation of a power distribution system are described herein. The embodiments described herein facilitate enhanced and economic operation of utility grid nodes using data gathered and maintained at a node level. Enhancing or optimizing the economic operation of utility nodes facilitates increasing the efficiency of energy delivery within the power grid. Increasing the efficiency of energy delivery facilitates increasing profits for the utility, reducing energy delivery costs, and/or decreasing utility bills for consumers. Moreover, the embodiments described herein facilitate balancing efficiency gains with revenue changes created as a result of modified energy consumption. For example, increasing the efficiency of energy delivery may cause an inverse effect to revenue because of a corresponding decrease in energy consumption.

Exemplary technical effects of systems, methods, and apparatus described herein include at least one of: (a) using a computer to determine a desired operating limitation of the power distribution system to be optimized; (b) calculating an effect on the operating limitation based on a modification of at least one operating parameter of one or more of the plurality of node devices; and (c) transmits a command to the node device to cause the node device to modify the operating parameter.

Figure 1:
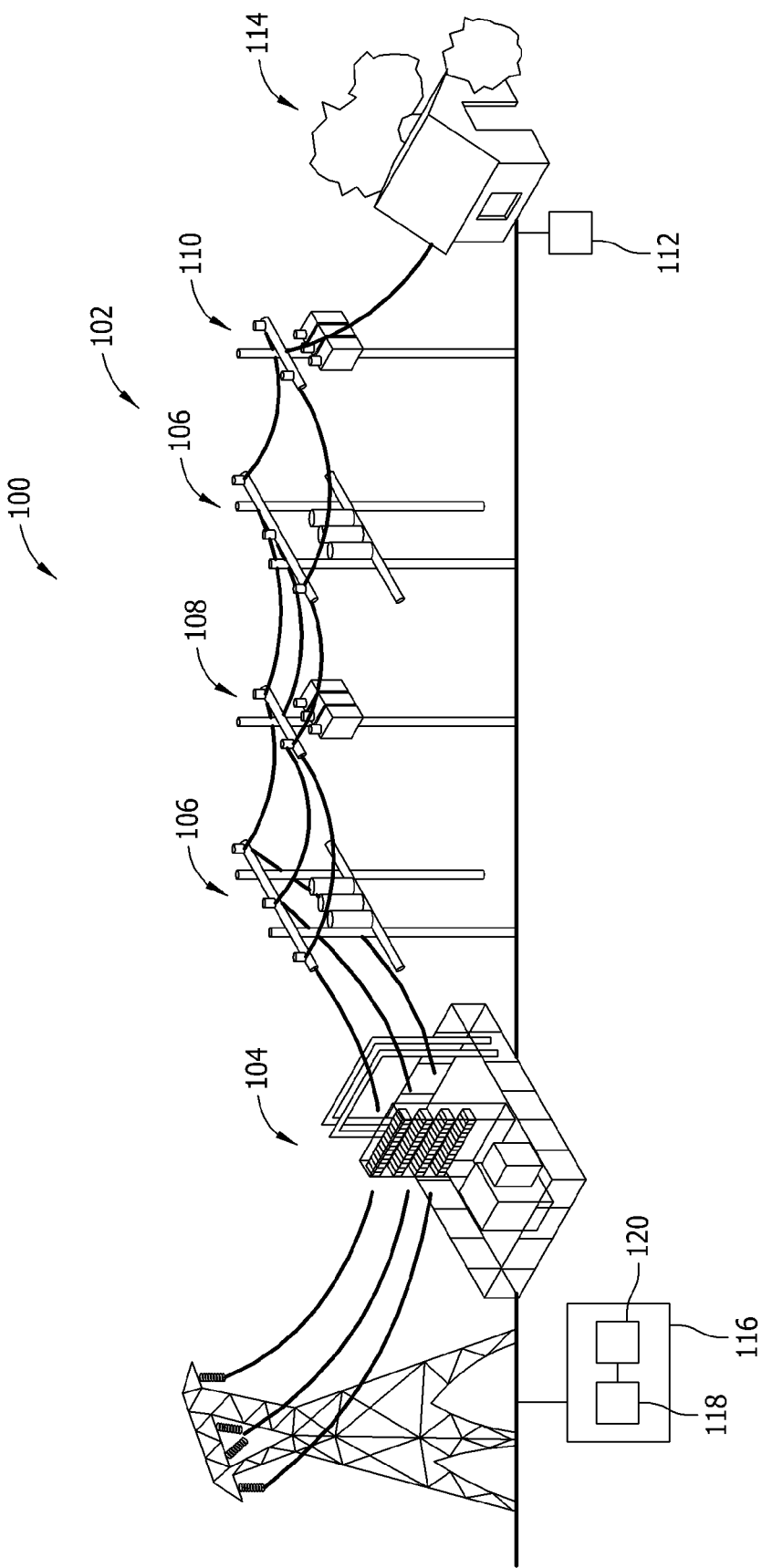
FIG. 1 is a schematic diagram of an exemplary power distribution system.

FIG. 1 is a schematic diagram of an exemplary power distribution system 100. In the exemplary embodiment, system 100 includes a plurality of nodes, or power distribution devices 102. Exemplary power distribution devices 102 include, for example, a substation load tap changer or voltage regulator 104, a line voltage regulator 106, a capacitor bank control 108, a single-phase or multiple-phase transformer 110, and/or a customer meter 112 coupled to a load 114, such as a customer's home. Voltage regulators 104 and 106, and capacitor bank controls 108 each operate at a designated voltage level and/or with a designated power factor.

Moreover, in the exemplary embodiment, system 100 includes a computer or controller 116 that is communicatively coupled to power distribution devices 102 via a network (not shown). Computer 116 includes at least one processor 118, such as a microprocessor, a microcontroller-based platform, a suitable integrated circuit or one or more application-specific integrated circuits (ASICs). Processor 118 is communicably coupled with, or is operable to access or to exchange signals with, at least one data storage or memory area 120. Memory area 120 may include one, or more than one, forms of memory. For example, memory area 120 can include random access memory (RAM), which can include non-volatile RAM (NVRAM), magnetic RAM (MRAM), ferroelectric RAM (FeRAM) and other forms of memory. Memory area 120 may also include read only memory (ROM), flash memory and/or Electrically Erasable Programmable Read Only Memory (EEPROM). Any other suitable magnetic, optical and/or semiconductor memory, by itself or in combination with other forms of memory, may be included in memory area 120. Memory area 120 may also be, or include, a detachable or removable memory, including, but not limited to, a suitable cartridge, disk, CD ROM, DVD or USB memory.

In the exemplary embodiment, memory area 120 stores a voltage profile and/or a power factor profile associated with each power distribution device 102. A voltage profile may be, for example, threshold operating voltages and/or any other parameters, related to reliability and/or device performance. A power factor profile may be, for example, threshold operating power factors. Moreover, memory area 120 stores desired efficiency values related to system 100 and/or desired efficiency values related to each power distribution device 102. For example, a capacitor bank may be activated or deactivated as necessary to adjust the efficiency of system 100 based on energy demand. In addition, memory area 120 stores desired profit values for a utility that operates system 100.

Furthermore, in the exemplary embodiment, memory area 120 stores a network hierarchy of power distribution devices 102. For example, the hierarchy can be organized in a tree form having a plurality of tiers that are associated with a respective power distribution device 102. For example, in one embodiment, a first tier of the hierarchy is associated with voltage regulator 106 and a second tier of the hierarchy is associated with a capacitor bank control 108. The hierarchy may be organized in any suitable manner. For example, the tiers may be associated with a distance from the utility and/or a distance from computer 116, such that a first tier is associated with customer meter 112, and a second tier is associated with a phase transformer 110 that is geographically and/or communicatively located closer to computer 116. Because phase transformer 110 is located closer to computer 116, such as before electrical lines connecting phase transformer 110 to multiple loads 114 are split to serve a plurality of loads 114, phase transformer 110 receives a greater portion of the total energy output from the utility and, thus, has a higher voltage level. Similarly, in such an embodiment, a third tier is associated with line voltage regulator 106 that is located closer to computer 116 and, thus, receives a greater portion of the total energy output from the utility as compared to phase transformer 110. In an alternative embodiment, the hierarchy may be organized in a reverse manner, wherein the node closest to computer 116, such as substation load tap changer or voltage regulator 104 is associated with the first tier. Alternatively, the hierarchy can be organized in any suitable manner that enables computer 116 to determine an optimal switch plan for system 100, as described in greater detail below.

In the exemplary embodiment, computer 116 is programmed with computer-executable instructions to use the data stored in memory area 120 to facilitate optimizing the operation of system 100 as a whole and/or components of system 100, such as one or more power distribution devices 102. For example, in the exemplary embodiment, computer 116 uses a plurality of functions stored in memory area 116 to calculate efficiency and/or profit of system 100 based on adjustments made to one or more operating parameters of system 100. Computer 116 compares the results of the functions to determine an optimal solution to an event detected in system 100, such as a demand response event related to peak energy demand within system 100. The event may also be a time-based event, such as a time of day, time of month, or time of year.

In the exemplary embodiment, a first function, for example, is a cost function related to modifying an operating parameter of a specified power distribution device 102 based on time, such as a specified period of time, the voltage profile of one or more power distribution devices 102 linked to the specified power distribution device 102, and the power factor profile of one or more power distribution devices 102 linked to the specified power distribution device 102. A second function is a cost function related to operating a specified power distribution device 102 based on time, such as a specified period of time, the voltage profile of one or more power distribution devices 102 linked to the specified power distribution device 102, and the power factor profile of one or more power distribution devices 102 linked to the specified power distribution device 102. A third function is similar to the second function but relates to operating a different specified power distribution device 102. A fourth function is a time-based cost function related to a demand response event isolated to a particular tier of the hierarchy stored in memory area 120. A fifth function relates to an effect of the demand response event on the voltage profile and/or the power factor profile of a specified power distribution device 102 at the specified tier of the hierarchy, and is based on the fourth function output, the voltage profile of one or more power distribution devices 102 linked to the specified power distribution device 102, and the power factor profile of one or more power distribution devices 102 linked to the specified power distribution device 102. It should be understood that computer 116 may be programmed to use the above-described functions in addition to or in the alternative to any other suitable function or value. Moreover, it should be understood that computer 116 may be programmed to use any suitable function or value not described above that enables computer 116 to determine an optimal operating environment for system 100, as described herein.

In the exemplary embodiment, computer 116 compares the results of the functions to determine, for example, the function that optimizes the desired operating limitation of system 100, such as efficiency or profit. Based on the comparison, computer 116 transmits a command to one or more power distribution devices 102 that causes the one or more power distribution devices 102 to modify a designated operating parameter such that the operating limitation of system 100 is enhanced.

Figure 2:
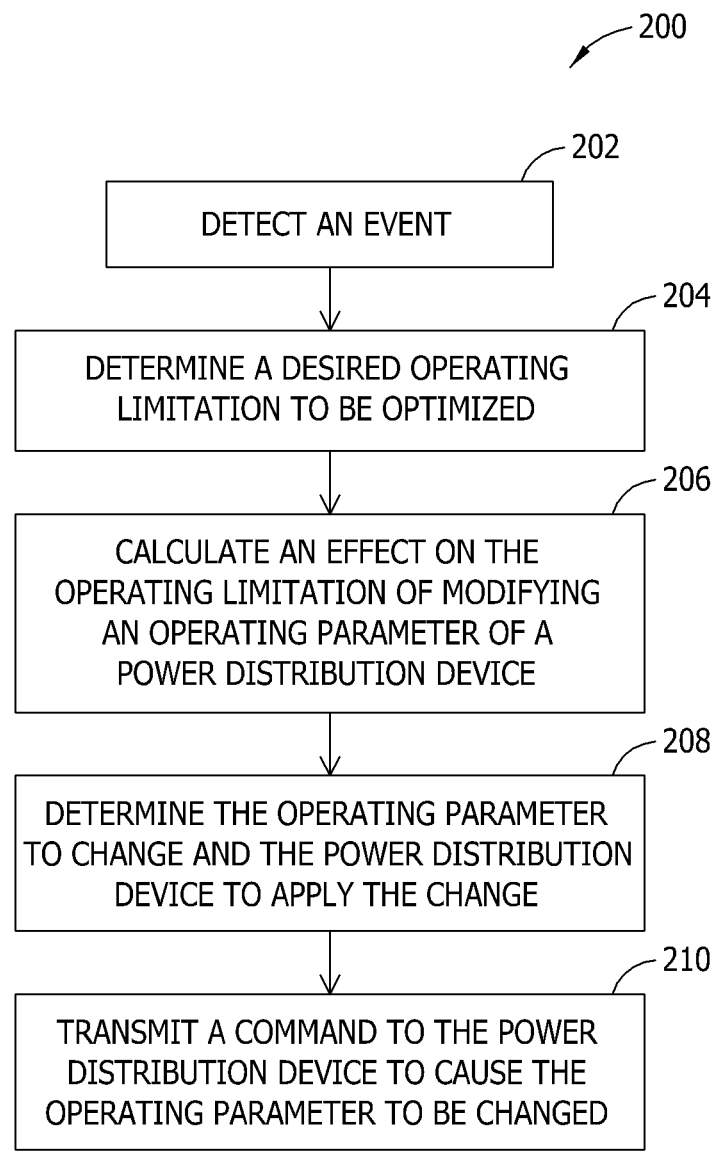
FIG. 2 is a flowchart that illustrates an exemplary method of operating the power distribution system shown in FIG. 1.

FIG. 2 is a flowchart 200 that illustrates an exemplary method of operating power distribution system 100 (shown in FIG. 1), such as by enhancing and/or optimizing operation of power distribution system 100 according to a particular operating limitation such as efficiency or profit. In the exemplary embodiment, computer 116 (shown in FIG. 1) detects 202 an event. The event may be a demand response event and/or an event that may be based on a time and/or on a control action in the grid, such as, for example, operation of a capacitor bank, voltage regulator and/or transformer tap changer. In response to detecting the event, computer 116 determines 204 a desired operating limitation of the power distribution system to be optimized to resolve the event. For example, the operating limitation may be related to efficiency of distributing power from a utility to loads 114 (shown in FIG. 1). Alternatively, the operating limitation may be related to costs associated with operating system 100. For example, adjusting an operating parameter of one or more power distribution devices 102 (shown in FIG. 1) may decrease the cost of operating system 100.

In the exemplary embodiment, computer 116 calculates 206 an effect on the operating limitation based on a modification of at least one operating parameter of one or more power distribution devices 102. For example, computer 116 can calculate 206 the effect on the operating limitation based on a modification of a voltage profile of one or more power distribution devices 102. Alternatively, computer 116 can calculate 206 the effect on the operating limitation based on a modification of a power factor profile of one or more power distribution devices 102. In the exemplary embodiment, computer 116 calculates 206 the effect using a plurality of functions, such as one or more time-based cost functions for modifying the operating parameter of one or more power distribution devices 102 and/or one or more time-based cost functions for initiating a demand response event in system 100.

Computer 116 compares the results of the functions to determine 208, for example, the function that optimizes the desired operating limitation of system 100, such as efficiency or profit. Based on the comparison, computer 116 transmits 210 a command to one or more power distribution devices 102 that causes the one or more power distribution devices 102 to modify a designated operating parameter such that the operating limitation of system 100 is enhanced. For example, computer 116 can cause the one or more power distribution devices 102 to modify a voltage profile and/or a power factor profile.

Exemplary embodiments of systems and methods for use in enhancing operation of a power distribution system are described above in detail. The systems and methods are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

As compared to known systems and methods for use in enhancing the operation of a power distribution system, the embodiments described herein facilitate enhanced and economic operation of utility grid nodes using data gathered and maintained at a node level. Enhancing or optimizing the economic operation of utility nodes facilitates increasing the efficiency of energy delivery within the power grid. Increasing the efficiency of energy delivery facilitates increasing profits for the utility, reducing energy delivery costs, and/or decreasing utility bills for consumers. Moreover, the embodiments described herein facilitate balancing efficiency gains with revenue changes created as a result of modified energy consumption. For example, increasing the efficiency of energy delivery may cause an inverse effect to revenue because of a corresponding decrease in energy consumption.

A computer or controller, such as those described herein, includes at least one processor or processing unit and a system memory. The computer or controller typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary power distribution system environment, embodiments of the invention are operational with numerous other general purpose or special purpose power distribution system environments or configurations. The power distribution system environment is not intended to suggest any limitation as to the scope of use or functionality of any aspect of the invention. Moreover, the power distribution system environment should not be interpreted as having any dependency or requirement relating to any one or combination of components illustrated in the exemplary operating environment.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of operating a power distribution system including a plurality of node devices, said method comprising:
   storing, at a computer, at least one of a voltage profile and a power factor profile associated with each of the plurality of node devices associated with the power distribution system, wherein the plurality of node devices include a customer meter, and at least one of a substation load tap changer, a substation voltage regulator, a line voltage regulator, a capacitor bank control, a single-phase transformer, and a multi-phase transformer;
   storing, at the computer, at least one network hierarchy of the node devices, wherein the at least one network hierarchy of the node devices represents an organizational relationship of the node devices, wherein the at least one network hierarchy of node devices includes a plurality of tiers, wherein at least one tier of the plurality of tiers is based on individual node devices;

detecting an event based on at least one of a current time and an energy demand within the power distribution system;

determining, by the computer, a desired operating limitation of the power distribution system to be optimized to resolve the event;

calculating, by the computer, an effect on the operating limitation based on:

a modification of at least one operating parameter of at least one node device of the plurality of node devices;

at least one of the voltage profile and the power factor profile;

the at least one network hierarchy of the node devices; and at least one time-based cost function for modifying the at least one operating parameter of the at least one node device; and transmitting a command, from the computer to the at least one node device, to cause the at least one node device to modify the at least one operating parameter to facilitate optimizing an economic operation of the node devices by balancing efficiency gains with consumer energy costs and revenue changes, wherein the command transmitted from said computer to said at least one node device facilitates optimizing the desired operating limitation to resolve the event.

2. A method in accordance with claim 1, further comprising modifying at least one of a voltage profile of the at least one node device and a power factor profile of the at least one node device in response to the command.

3. A method in accordance with claim 1, wherein comprises calculating a time-based cost function for initiating a demand response event in the power distribution system.

4. A method in accordance with claim 3, further comprising determining an effect of the demand response event on the at least one operating parameter of the at least one node device.

5. A method in accordance with claim 1, wherein the at least one time-based cost function includes at least one of:

a time-based cost function of at least one of the network hierarchy of node devices;

a time-based cost function of at least one of the voltage profiles;

a time-based cost function of at least one of the power factor profiles; and a time-based cost function of at least one of a profit value profile associated with a plurality of loads associated with the power distribution system.

6. A power distribution system comprising:

a plurality of node devices including a customer meter, and at least one of a substation load tap changer, a substation voltage regulator, a line voltage regulator, a capacitor bank control, a single-phase transformer, and a multi-phase transformer; and a computer communicatively coupled to said plurality of node devices, said computer comprising a memory area configured to store at least one operating parameter of each of said plurality of node devices, said computer further comprising a processor programmed to:

store, at said memory area, at least one of a voltage profile and a power factor profile associated with each of said plurality of node devices;

store, at said memory area, at least one network hierarchy of said node devices, wherein the at least one network hierarchy of said node devices represents an organizational relationship of said node devices, wherein the at least one network hierarchy of node devices includes a plurality of tiers, wherein at least one tier of the plurality of tiers is based on individual node devices;

detect an event based on at least one of a current time and an energy demand within the power distribution system;

determine a desired operating limitation of said power distribution system to be optimized based on the event;

calculate an effect on the operating limitation based on:

a modification of the at least one operating parameter of at least one node device of said plurality of node devices;

at least one of the voltage profile and the power factor profile;

the at least one network hierarchy of said node devices; and at least one time-based cost function modifying the at least one operating parameter of said at least one node device; and transmit a command to said at least one node device to cause said at least one node device to modify the at least one operating parameter to facilitate optimizing an economic operation of the node devices by balancing efficiency gains with consumer energy costs and revenue changes, wherein the command transmitted from said computer to said at least one node device facilitates optimizing the desired operating limitation to resolve the event.

7. A power distribution system in accordance with claim 6, wherein said at least one node device is configured to modify at least one of a voltage profile of said at least one node device and a power factor profile of said at least one node device in response to the command.

8. A power distribution system in accordance with claim 6, wherein said processor is further programmed to calculate a time-based cost function for initiating a demand response event in said power distribution system.

9. A power distribution system in accordance with claim 8, wherein said processor is further programmed to determine an effect of the demand response event on the at least one operating parameter of said at least one node device.

10. A power distribution system in accordance with claim 6, wherein said at least one time-based cost function includes at least one of:

a time-based cost function of each of the network hierarchy of node devices;

a time-based cost function of at least one of the voltage profiles;

a time-based cost function of at least one of the power factor profiles; and a time-based cost function of at least one of a profit value profile associated with a plurality of loads associated with the power distribution system.

11. A computer for use with a power distribution system including a plurality of node devices, said computer comprising:

a memory area configured to store at least one operating parameter of each of the plurality of node devices, wherein the plurality of node devices include a customer meter, and at least one of a substation load tap changer, a substation voltage regulator, a line voltage regulator, a capacitor bank control, a single-phase transformer, and a multi-phase transformer; and a processor communicatively coupled to said memory area and configured to:

store, at said memory area, at least one of a voltage profile and a power factor profile associated with each of the plurality of node devices associated with the power distribution system;

store, at said memory area, at least one network hierarchy of the node devices, wherein the at least one network hierarchy of the node devices represents an organizational relationship of the node devices, wherein the at least one network hierarchy of node devices includes a plurality of tiers, wherein at least one tier of the plurality of tiers is based on individual node devices;

detect an event based on at least one of a current time and an energy demand within the power distribution system;

determine a desired operating limitation of the power distribution system to be optimized based on the event;

calculate an effect on the operating limitation based on:
 a modification of the at least one operating parameter of at least one node device of the plurality of nodes devices;
 at least one of the voltage profile and the power factor profile;
 the at least one network hierarchy of the node devices; and
 at least one time-based cost function modifying the at least one operating parameter of the at least one node device; and transmit a command to the at least one node device to cause the at least one node device to modify the at least one operating parameter to facilitate optimizing an economic operation of the node devices by balancing efficiency gains with consumer energy costs and revenue changes, wherein the command transmitted from said computer to said at least one node device facilitates optimizing the desired operating limitation to resolve the event.

12. A computer in accordance with claim 11, wherein said processor is further programmed to calculate a time-based cost function for initiating a demand response event in the power distribution system.

13. A computer in accordance with claim 12, wherein said processor is further programmed to determine an effect of the demand response event on the at least one operating parameter of the at least one node device.

14. A computer in accordance with claim 11, wherein said processor is further programmed to calculate the time-base cost function including at least one of:
 a time-based cost function of each of the network hierarchy of node devices;
 a time-based cost function of at least one of the voltage profiles;
 a time-based cost function of at least one of the power factor profiles; and
 a time-based cost function of at least one of a profit value profile associated with a plurality of loads associated with the power distribution system.

* * * * *